INVENTOR.
EDWARD E. HUPP
BY J. O. Clayton
ATTORNEY

May 15, 1956     E. E. HUPP     2,745,383
POWER BOOST CONTROL

Filed Sept. 18, 1952     2 Sheets-Sheet 2

INVENTOR.
EDWARD E. HUPP
BY
H. O. Clayton
ATTORNEY

United States Patent Office 2,745,383
Patented May 15, 1956

2,745,383

POWER BOOST CONTROL

Edward E. Hupp, South Bend, Ind., assignor to Bendix Aviation Corporation, South Bend, Ind., a corporation of Delaware Application September 18, 1952, Serial No. 310,173

11 Claims. (Cl. 121—41)

The invention relates to pneumatic servo-motors adapted to actuate the master cylinder of a hydraulic brake system. It relates more particularly to servo-motors the working means thereof comprising two elements, the relative displacement of which controls a valve constituting a part of the working means and operative to control the flow of a power fluid, preferably compressed air, from an inlet chamber provided in the valve body directly into the working chamber of the servo-motor, the braking reaction being transmitted to the driver preferably through the intermediary of a diaphragm connected to the driver operated element and subjected on one of its faces to the atmospheric pressure and on its opposite face to the pressure of the compressed air in the working chamber of the servo-motor.

The present invention has for an object improvements intended to better the operation of the valve to suppress the wobbling of the latter which is subjected in operation to antagonistic forces corresponding on the one hand to the applying effort exerted by the driver and on the other hand to the braking reaction transmitted to the latter and resulting from the pressure differential exerted over the diaphragm.

According to one feature of the invention a restriction is provided between the working chamber of the servo-motor and the diaphragm face subjected to the pressure of the compressed air in the working chamber. This restriction is preferably effected by providing between the said diaphragm face and the working chamber a partition carried by one piston element and provided with a graduated opening through which passes the control element actuated by the driver, and which provides between the inner periphery of the partition and the external surface of said control member such a play that the compressed air admitted into the working chamber is subjected to an adequate braking before being admitted to act onto the diaphragm, thus controlling its action upon the diaphragm and suppressing the wobbling of the valve actuated by the displacement of the said control element.

A further object of the invention is to compensate the unrolling effect of a flexible hose connected to the admission chamber of the valve and rolled around the working means of the servo-motor, said hose having a tendency to straighten out under the action of the compressed air feeding the valve. According to the invention a return spring, located between the respective housing head of the motor and the piston or equivalent power element, is hooked at one of its ends to an element forming part of the said head, and at its opposite end to an element connected to the piston thus opposing a resistance to the unrolling of the said hose.

Other features of the invention, including the construction of means to establish a permanent connection between the atmosphere and the interior of a protection bellows connected to the control push rod and the construction of the valve body, will appear from the following description by referring to the accompanying drawings, in which.

Figure 1:
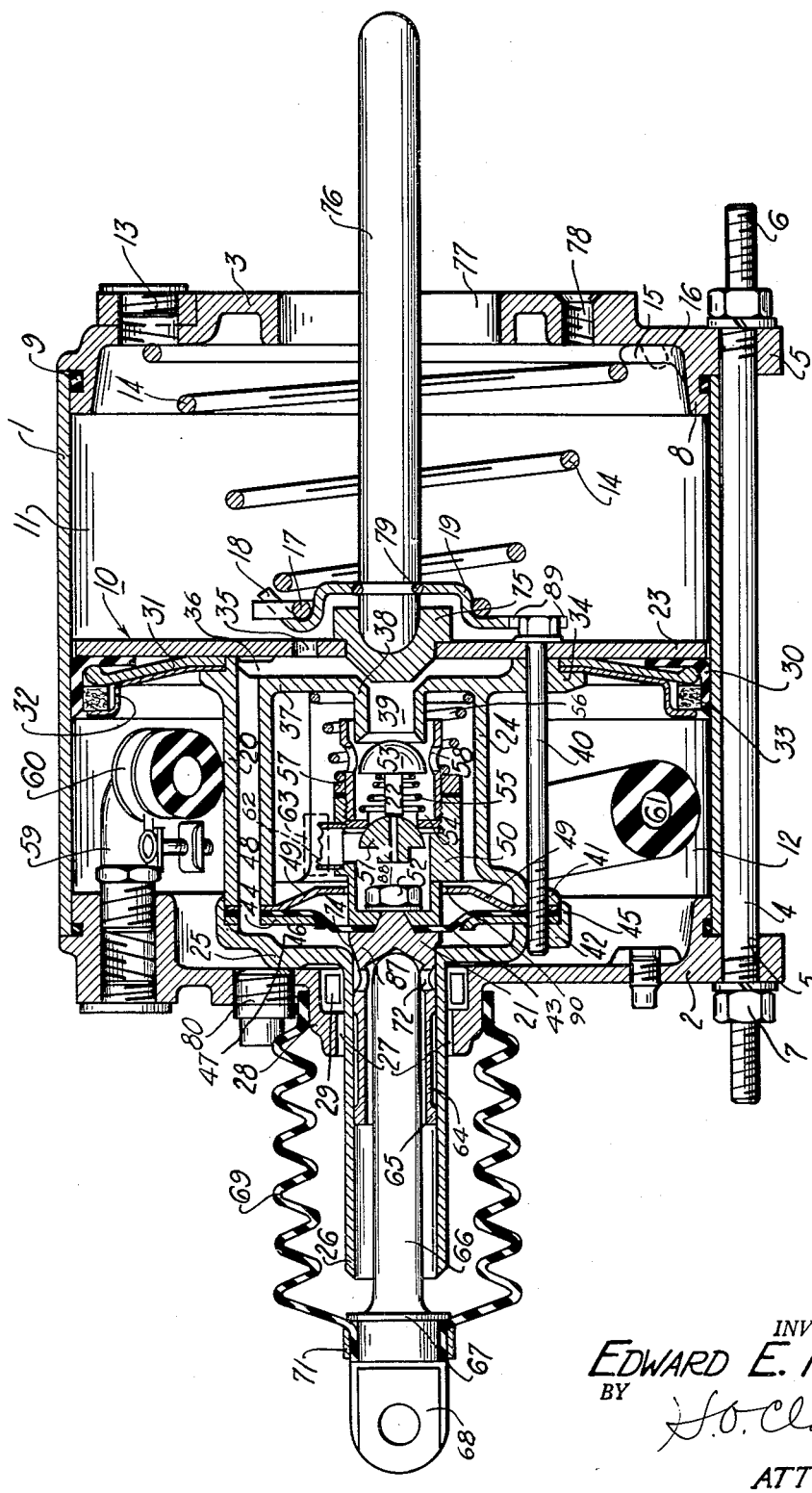
Figure 1 shows one embodiment of the servo-motor constituting my invention.

The servo-motor of my invention comprises a cylindrical housing 1 preferably made of iron sheet and closed at both of its ends by two circular heads 2 and 3 assembled by means of pins 4 which pass through openings 5 provided on the periphery of the said heads. The pins 4 have threaded ends 6 on which are tightened nuts 7 to lock the heads 2 and 3 in engagement with the respective ends of the housing. The heads 2 and 3 have flanges 8 extending towards the interior of the housing and are equipped with grooves in which are located sealing rings 9 preferably made of rubber and which are in a fluid tight engagement with the adjacent ends of the housing.

In the embodiment shown in the drawing, the working means of the servo-motor comprises a piston, designated generally by the reference numeral 10, and which divides the housing into two chambers, one of which, 11, is permanently connected to the atmosphere, and the second, 12, acts as the working chamber of the said servo-motor. The connection of the chamber 11 with the atmosphere is provided by an opening 13 formed in the head 3 and adapted to be connected to a fitting equipped with an air filter, not shown on the drawing. The chamber 11 is equipped with a return spring 14, one end of which acts on the piston 10, and the opposite end of which is supported by the head 3. It will be noted that the end 15 of the spring is locked due to the fact that it takes support on an abutment 16 provided on the head 3. The opposite end 17 of the said spring projects into a slot 18 formed on an abutment plate 19 for a purpose which will be described more fully hereinafter.

The piston 10 comprises two valve controlling elements 20 and 21. The element 20, within which is provided a control valve 22, is formed with a piston head 23, an intermediate part 24 and a web 25 extended by a tubular plunger 26. The intermediate part 24 is substantially formed as a cylinder having an axis co-axial with that of the housing. The plunger 26 is guided in a bearing 27 provided in an annular projection 28 formed on the head 2. A sealing cup 29 located in a groove provided in the bearing is in engagement with the plunger 26. The piston head 23 is equipped with a leather or rubber sealing ring 30, locked by a metallic plate 31. A yielding iron sheet disk 32 is adapted to keep a greasing wicket 33 in engagement with the sealing ring 30. The inner peripheries of the plate 31 and the sheet disk 32 are located between the head 23 and an annular shoulder 34 formed on the intermediary part 24.

The piston head 23 is formed with an opening 35 which communicates with a chamber 36 formed on the one hand by a wall 37 spaced at a certain distance from the piston head 23 and parallel to the latter. The wall 37 is formed with an annular hub 38 providing a passage 39 which communicates with the chamber 36 and which is controlled by the valve 22, as described hereinafter.

The piston head 23, the intermediate part 24 and the web 25 are assembled with interposition of suitable sealing washers by means of bolts 40 extending through openings provided in the piston head 23 and the adjacent shoulders 34 as well as through corresponding openings formed in adjacent shoulders 41, 42 respectively provided in the intermediate part 24 and in the web 25. The shoulder 42 is threaded to receive the corresponding ends of the bolts 40. Between the intermediate part 24 and the web 25 there is located a diaphragm 43 the peripheral part of which is mounted between the shoulders 41, 42 with the interposition of a metal ring 44 acting as a support for the latter and which determines the "useful" surface of the diaphragm subjected in operation to a pressure differential. It will be noted that the web 25 is formed with an annular extension 45, the axis of which registers with that of the servo-motor and has for an object to insure an adequate centering of the web 25 with respect to the intermediate part 24. The diaphragm forms within the element 20 two compartments 46, 47, one of which, 46, located at the left of the diaphragm, is permanently connected to the atmosphere through the intermediary of an opening formed in the diaphragm which registers with a passage 48 formed in the intermediate part 24 and the axis of which is parallel to that of the housing. The passage 48 merges into the chamber 36 which, as stated above, communicates with the atmosphere. At the right of the diaphragm and fixed between the shoulders 41 and 42 is located a partition 49 formed with a graduated opening through which passes the body 50 of the valve. This body portion is connected to the valve control element 21 which is in turn actuated by the driver. Suitable play is provided between the periphery of the opening formed in partition 49 and the body 50 for a purpose which will be described hereinafter.

The piston 10 is urged by a return spring 14 into rest position in which the web 25, forming part of the element 20, contacts the head 2.

Figure 2:
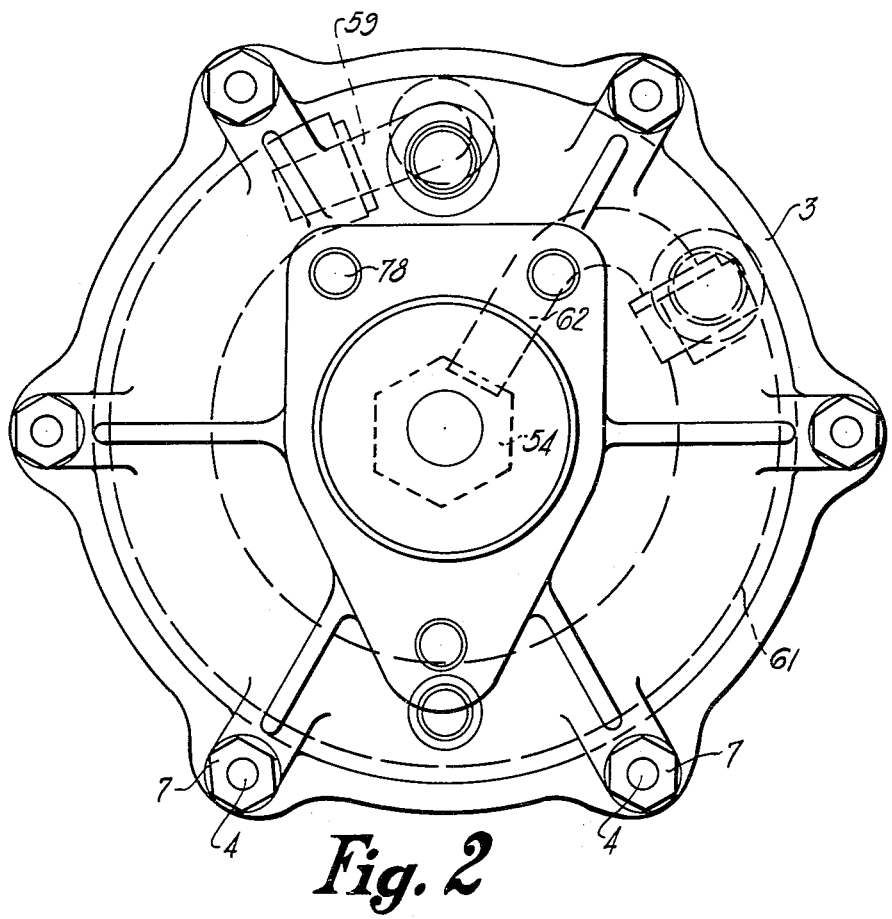
Figure 2 is an end view of the servo-motor disclosed in Figure 1, said figure illustrating in a diagrammatical manner the arrangement of the feed hose.

The control valve 22 comprises an inlet valve member 51 located within the body portion 50; and said body portion is locked by means of a nut 52 on a threaded pin projecting from the valve control element 21. It will be noted that the central part of the diaphragm is locked between the body 50 and an annular shoulder provided on the element 21. The inlet valve member 51 is connected by means of a pin to an exhaust valve member 53 located within a shouldered sleeve 54 threaded into the body 50 and which may have an hexagonal surface as shown in Figure 2. As illustrated, the inlet valve member 51 is biased into engagement with a seat formed on an inner shoulder of sleeve 54. This biasing operation is effected by means of a spring 55 taking support at one of its ends against the aforementioned shoulder whilst the opposite end of the spring takes support on the head of the outlet valve member 53. Furthermore, a second spring 56 is mounted between a collar 57 formed on sleeve 54, and the wall 37. This spring 56 tends to separate the element 21 from element 20 to thus remove the exhaust valve member 53 from its seat formed by the end of the hub 38. The spring 56 biases a shoulder 87 of the element 21 into contact with the web 25.

Sleeve 54 is mounted with play on hub 38 and is adapted to reciprocate on said hub. The sleeve is provided with ports 58 which, in normal position, connect passage 39 to the interior of thes intermediary part 24. The compressed air source is connected to a cranked fitting 59 carried by the head 2 on which is locked, by means of a clamping collar 60, the end of a flexible hose 61 located in the working chamber 12, and which, as illustrated, is rolled in spiral around the intermediary part 24. The opposite end of the flexible hose 61 is connected to a tubing 62 fixed on the body 50 and which passes, with a relatively great play, through an aperture provided in the intermediary part 24 shown diagrammatically by the reference numeral 63. It is to be noted that the tubing 62 on which is mounted the hose 61 is connected to the inlet chamber 88 of the valve, said valve being controlled by valve member 51. Compartment 47 adjacent to the diaphragm communicates with the working chamber 12 through the intermediary of the play provided between the partition 49 and the body 50 and through the intermediary of the play provided between the tubing 62 and the aperture 63.

The valve operating element 21 is reciprocally mounted within the housing provided by the tubular plunger 26. This element is formed with an imperforate portion integrally made with a skirt 64 which is preferably provided at its ends with bearings 65. Within the skirt 64 is provided a housing which receives the spherical end of a push rod 66 the opposite end of which is provided with an annular shoulder 67 integral with a clevis 68 connected to the driver-operated control means, which may be the usual brake pedal, not shown. A fluid-tight flexible rubber bellows 69, having no apertures communicating with the atmosphere is mounted at one of the ends of the push rod 66 in a groove provided on the shoulder 67, while the opposite end of this bellows is mounted on projection 28. The respective ends of the bellows 69 are locked by means of clamping collars 71, thus realizing a complete sealing of the working chamber 12 of the servo-motor. It is to be noted that the only part of the servo-motor working means exposed to the exterior is formed by the clevis 68.

It is to be noted that the setting into action of the servo-motor results in a decrease in length of the bellows 69, which when the pedal is at the end of its compression stroke becomes fully flattened. To prevent any stress on the bellows, or even the blasting of the latter and also to suppress the introduction of an undesirable resistance due to compression of air in the bellows, the interior of the latter is connected to the compartment 46 adjacent to the diaphragm, said diaphragm being connected to the atmosphere. This connection between the interior of the bellows and the compartment 46 is established through the intermediary of ports 72 provided in the wall of skirt 64. The interior of the bellows is connected to the compartment 46 by means of a groove 74 formed on the inner edge of the web 25 and by the ports 72. The interior of the bellows is thus permanently connected to the atmosphere by means of ports 72, compartment 46, passage 48, chamber 36, opening 35 and chamber 11.

As illustrated, the piston head 23 is provided with an aperture in which may be disposed a plate 75 equipped with a spherical housing in which engages the corresponding end of a push rod 76 the opposite end of which passes through an aperture 77 formed in the head 3; and the rod 76 is adapted to engage the piston of a hydraulic master cylinder the conventional mounting flange thereof being secured by means of screws engaging into threaded ports 78 provided on head 3. As shown in Figure 2 the head 3 is provided with radial reinforcement ribs as well as with a surface 80 in which are provided the threaded ports 78 and which is adapted to cooperate with a corresponding surface provided on the master cylinder.

The return spring 14 acts on piston 10 through the intermediary of the aforementioned abutment plate 19 which is supported on a stop ring 79 mounted in a groove provided in the push rod 76. The aperture 77 is preferably of a diameter sufficient to permit a free rocking of the push rod 76.

It is to be noted that rotation of abutment plate 19 is prevented due to the provision thereon of one or several slots, one being shown engaged with the respective head of assembly bolt 40 of the piston element 20 as shown at 89. The return spring 14 one end of which takes support against the abutment 16 and the opposite end of which projects in slot 18, provided on the abutment plate 19, is coiled and secured in such a manner that it tends to compensate the torque transmitted to element 20 of the piston due to the rolling or uncoiling of the flexible hose 61 coiled around element 20 which tends to straighten under the action of the compressed air sent into the valve.

The above servo-motor operates as follows: The elements being positioned as shown on the drawings, the effort applied by the driver acts on the clevis 68 and is transmitted by means of the push rod 66 to the valve control element 21 so as to apply thereto a displacement towards the interior of the servo-motor. This displacement of the element 21 takes place against the resistance of spring 56 mounted on sleeve 54 and the movement of said element is guided by the skirt 64 within the tubular plunger 26. This operation results in bringing the outlet valve member 53 in engagement with its seat on the hub 38 and a closing of the passage 39 thus closing off the supply of atmospheric pressure to the working chamber 12. The further displacement of the element 21 results in the opening of the inlet valve member 51 thereby establishing a direct communication between the inlet chamber of the valve and the working chamber 12. In this operation the compressed air is not subjected to a drop of pressure which would certainly occur if said air had to flow through long passages forming part of the inlet system.

The compressed air acts thus on the one hand on the head of piston 23 which is accordingly displaced to effect its working stroke; and on the other hand the compressed air acts on the useful surface of the diaphragm 43, the opposite face of which is subjected to atmospheric pressure then existing in the compartment 46. The diaphragm then transmits through the intermediary of the element 21 and of the push rod 66 actuated by the driver in one direction, a reaction proportional to the braking action acting in the opposite direction thus allowing the driver to get a feeling of the development of the braking operation.

It is to be noted that the compressed air coming from the inlet chamber 88 of the valve, controlled by the valve member 51, has to pass through a restriction 90, which consists of the clearance between the partition 49 and the external surface of the body 50 before it acts on the diaphragm 43. This construction results in a suppression of the wobbling of the valve which would otherwise tend to take place due to the antagonist efforts acting on the diaphragm connected to the driver operated valve control element 21. The above described restriction, that is, the clearance between the partition 49 and the periphery of the body portion 50, provides the desired graduation of the compressed air which acts upon the diaphragm 43 thus regularizing the operation of the servo-motor by suppression of the wobbling of the control valve.

The reaction created on the diaphragm 43 tending to displace toward the left the control element 21 and thus close the inlet valve member 51 and open outlet valve member 53, is proportional to the compressed air action exerted on the piston, so that each value of the effort exerted on the brake pedal corresponds to a determined braking intensity. Due to the restriction provided in the system which conveys the compressed air to act onto the diaphragm 43, the reaction transmitted by the diaphragm is regularly established while suppressing detrimental jerks. The "wobbling" or "jerks" referred to is commonly known as "hunting" or "valve flutter" and is eliminated by means of the "dashpot" effect of chamber 47 which has air metered therein by the opening 90, as previously mentioned. The ideal condition after brake pedal pressure is applied would be an immediate lapping of the valves 51 and 53. This occurs when a constant pressure is applied by the operator's foot on the brake pedal. Valve 53 would be seated and continued displacement of the sleeve 54 results in unseating of valve 51 admitting high pressure to the motor. When this occurs, and the head of piston 23 starts to move toward the right, 21 is no longer being displaced toward the right, so valve 51 becomes reseated and since valve 53 is still seated a "lapped" condition occurs and high pressure is trapped in the work chamber.

In actual operation the lapped condition is not immediately reached due to "overshooting" of the valve. When the brake pedal is depressed and the resistances of the high pressure on valve 51 holding it closed in chamber 88, that of spring 55 and that of spring 56 are overcome and as the valve 51 is cracked, there is an immediate change in the amount of force required to unseat valve 51. The result is generally that too much air is allowed to pass into work chamber 12. If the metering aperture 90 were not present, the full reaction would immediately be felt on diaphragm 43 and the operator of the brake pedal would attempt to compensate with his foot which would result in "fluttering" or "hunting" and eliminates smooth application of pedal pressure. The presence of chamber 47, results in a lag in the feeling of the surge of back pressure on diaphragm 43 and thus the operator can gradually compensate for an excessive application of pressure on the brake pedal and the "lapped" condition of valves 51 and 53 is readily reached by means of a smoothly functioning servo motor, which results in smooth and constant application of force to the braking system master cylinder.

In case of failure of the compressed air source, the driver will be able to apply the brakes by his physical effort transmitted through the intermediary of the push rod 66. This operation will bring the sleeve 54 into engagement with the wall 37 of the intermediary part 24 so that the physical effort exerted by the driver will be transmitted to the push rod 76. It is to be noted that in this operation, that is, the application of the brakes by the physical effort of the driver, the control valve 22 does not take part in the transmission of the effort exerted by the driver.

The working chamber 12 of the servo-motor may be equipped with a nipple 80 adapted to be connected to the braking system of a trailer.

Although a particular embodiment of my invention has been described, it will be understood by those skilled in the art that the object of the invention may be attained by the use of constructions different in certain respects from that disclosed without departing from the under-lying principles of the invention. I therefore desire by the following claims to include within the scope of my invention all such variations and modifications by which substantially the results of my invention may be obtained through the use of substantially the same or equivalent means.

I claim:

1. A servo-motor adapted to be employed as the actuating means of a hydraulic brake master cylinder, said motor including a cylinder housing closed at its ends by two disc like members, a piston member comprising two valve controlling elements housed within the cylinder housing and serving to divide the motor into two compartments, power fluid conducting means housed within one of said compartments and encircling a portion of the piston member, and piston actuating spring means housed within the other of said compartments, said spring actuating means being so connected to the piston and so constructed as to be operative to compensate for the torque generated by the straightening of the power fluid conducting means when power fluid is transmitted through said means.

2. A servo-motor adapted to be employed as the actuating means of a hydraulic brake master cylinder, said member including a cylinder housing closed at its ends by two disc like members, a piston member comprising two valve controlling elements housed within the cylinder housing and dividing the motor into two compartments, said valve controlling elements being connected together by means of a pressure responsive flexible sealing member, valve means for controlling the operation of the motor, said valve means being operatively connected to said valve controlling elements and being housed within one of the valve controlling members, and a compartment forming member connected to said last mentioned valve controlling member and forming a compartment with said flexible member, said compartment forming member surrounding said valve means forming a passage therewith to control the passage of power fluid into said last mentioned compartment eliminating wobbling of said valve and surging of said flexible diaphragm.

3. A servo-motor adapted to be employed as the actuating means of a hydraulic master cylinder or the like comprising, a housing, a movable member in said housing, a first valve control element in said housing, a second valve control element in said housing surrounding at least part of said first element and providing a substantially sealed chamber therewith, said elements being adapted for relative movement, one of said elements being connected to said movable member and the other of said elements extending externally of said housing, means providing sliding and sealing engagement between said other element and said housing, flexible pressure sealing means extending between said elements dividing said chamber into first and second opposed chambers, valve means operatively connected between said elements for providing variable pneumatic pressure to said second chamber, and a partition member at least a portion of which is rigid in said second chamber forming a variable pressure chamber with said flexible pressure sealing means and having means providing restricted communication between said variable pressure chamber and the remainder of said second chamber, said partition member being rigidly connected to one of said elements, whereby the pressure in the variable pressure chamber will be gradually changed upon a change in pressure in said second chamber.

4. A servo-motor adapted to be employed as the actuating means of a hydraulic master cylinder or the like comprising, a housing, a movable member in said housing, a first valve control element in said housing, a second valve control element in said housing surrounding at least part of said first element and providing a substantially sealed chamber therewith, said elements being adapted for relative movement, one of said elements being connected to said movable member and the other of said elements extending externally of said housing, means providing sliding and sealing engagement between said other element and said housing, flexible pressure sealing means extending between said elements dividing said chamber into first and second opposed chambers, valve means operatively connected between said elements for providing variable pneumatic pressure to said second chamber, flexible pneumatic pressure transmitting means in the motor encircling said valve control elements and connected to said valve means, and a partition member at least a portion of which is rigid in said second chamber forming a variable pressure chamber with said flexible pressure sealing means and having means providing restricted communication between said variable pressure chamber and the remainder of said second chamber, said partition member being rigidly connected to one of said elements, whereby the pressure in the variable pressure chamber will be gradually changed upon a change in pressure in said second chamber.

5. A servo-motor adapted to be employed as the actuating means of a hydraulic master cylinder or the like comprising, a housing, a movable wall in said housing, a first valve control element in said housing, a second valve control element in said housing surrounding at least part of said first element and providing a substantially sealed chamber therewith, said elements being adapted for relative movement, one of said elements being connected to said movable wall and the other of said elements extending externally of said housing, means providing sliding and sealing engagement between said other element and said housing, a diaphragm extending between said elements dividing said chamber into first and second opposed chambers, a port in said second chamber, valve means operatively connected between said elements for providing variable pneumatic pressure at said port, and a rigid partition member rigidly supported by one of said members forming a variable pressure chamber with said diaphragm and having means providing restricted communication between said variable pressure chamber and said port, whereby the pressure in the variable pressure chamber will be gradually changed upon a change in pressure at said port.

6. A servo-motor adapted to be employed as the actuating means of a hydraulic master cylinder or the like comprising, a housing, a movable wall in said housing, a first valve control element in said housing, a second valve control element in said housing surrounding at least part of said first element and providing a substantially sealed chamber therewith, said elements being adapted for relative movement, said second element being connected to said movable wall and said first element extending externally of said housing, means providing sliding and sealing engagement between said first element and said housing, a diaphragm extending between said elements dividing said chamber into first and second opposed chambers, a port in said second chamber, valve means operatively connected between said elements for providing variable pneumatic pressure at said port, and a rigid partition member rigidly supported by said second element and forming a variable pressure chamber with said diaphragm, said partition member having a hole therein adapted to receive said first element, and providing a restricted flow passageway across said partition member, whereby the pressure will be gradually changed in the variable pressure chamber upon a change in pressure at said port.

7. A servomotor adapted to be employed as a hydraulic master cylinder actuating means, said motor including a motor housing, a piston member housed within said motor housing including two valve controlling members dividing the housing into two compartments, power fluid conducting means housed within one of said compartments and encircling a portion of said piston member and connected thereto, and resilient piston actuating means housed within the other of said compartments, said resilient actuating means being so arranged with said piston and being so constructed to be operative to compensate for the torque generated by the tendency of the power fluid conducting means to straighten out when power fluid is transmitted through said means.

8. A servomotor adapted to be employed as a hydraulic cylinder actuating means, said motor including a motor housing closed at its end by two disk-like members, a piston member including two valve controlling members housed with said housing and dividing said housing into two compartments, a flexible conduit housed within one of said compartments and wrapped about a portion of said piston member and connected thereto, and a piston actuating coil spring means housed within the other of said compartments, said coil spring being connected to the piston and an end of said motor housing, operative to compensate for the torque generated by the tendency of said flexible conduit to straighten out when power fluid is transmitted therethrough.

9. In pneumatic control means for a fluid pressure motor, a first valve control element, a second valve control element surrounding at least part of said first element and providing a substantially sealed chamber therewith, said elements being adapted for relative movement, movable pressure sealing means extending between said elements dividing said chamber into first and second opposed chambers, valve means operatively connected between said elements for providing variable pneumatic pressure to said second chamber, a partition member at least a portion of which is rigid in said second chamber forming a variable pressure chamber with said movable pressure sealing means and having means providing restricted communication between said variable pressure chamber and the remainder of said second chamber, said partition member being rigidly connected to one of said members, whereby the variable pressure chamber will be gradually changed upon a change of pressure in said second chamber.

10. In pneumatic control means for a fluid pressure motor, a first valve control element, a second valve control element surrounding at least part of said first element and providing a substantially sealed chamber therewith, said elements being adapted for relative movement, a diaphragm extending between said elements dividing said chamber into first and second opposed chambers, a port in said second chamber, valve means operatively connected between said elements and providing variable pneumatic pressure at said port, a rigid partition member in said second chamber rigidly supported by one of said valve control elements and forming a variable pressure chamber with said diaphragm and having means providing restricted communication between said variable pressure chamber and said port, whereby the pressure in the variable pressure chamber will be gradually changed upon a change in pressure at said port.

11. In pneumatic control means for a fluid pressure motor a first valve control element, a second valve control element surrounding at least part of said first element and providing a substantially sealed chamber therewith, said elements being adapted for relative movement, a diaphragm extending between said elements dividing said chamber into first and second opposed chambers, a port in said second chamber, valve means operatively connected between said elements for providing variable pneumatic pressure at said port, a rigid partition member in said second chamber rigidly supported by one of said valve control elements and forming a variable pressure chamber with said diaphragm, said partition member having a hole therein adapted to receive the other of said valve control elements to provide a restricted flow passageway across said partition member, whereby the pressure will be gradually changed in the variable pressure chamber upon a change in pressure at said port.

References Cited in the file of this patent

UNITED STATES PATENTS

| | | |
|---|---|---|
| 1,765,760 | Duty et al. | June 24, 1930 |
| 1,987,505 | Edler | Jan. 8, 1935 |
| 2,018,844 | Folberth et al. | Oct. 29, 1935 |
| 2,307,910 | Baade | Jan. 12, 1943 |
| 2,365,960 | Ingres | Dec. 26, 1944 |
| 2,475,105 | Mitton | July 5, 1949 |